US010582106B2

(12) United States Patent
Li et al.

(10) Patent No.: US 10,582,106 B2
(45) Date of Patent: Mar. 3, 2020

(54) INTELLIGENT BALL HEAD AND METHOD FOR PERFORMING SELF-PHOTOGRAPHING BY USING THE SAME

(71) Applicant: Guangdong Sirui Optical Co., Ltd., Zhongshan (CN)

(72) Inventors: Jie Li, Zhongshan (CN); Xiangyu Huang, Zhongshan (CN)

(73) Assignee: GUANGDONG SIRUI OPTICAL CO., LTD., Zhongshan (CN)

( * ) Notice: Subject to any disclaimer, the term of this patent is extended or adjusted under 35 U.S.C. 154(b) by 0 days.

(21) Appl. No.: 15/544,516

(22) PCT Filed: Nov. 24, 2016

(86) PCT No.: PCT/CN2016/107099
§ 371 (c)(1),
(2) Date: Jul. 18, 2017

(87) PCT Pub. No.: WO2018/018806
PCT Pub. Date: Feb. 1, 2018

(65) Prior Publication Data
US 2019/0158719 A1  May 23, 2019

(30) Foreign Application Priority Data

Jul. 27, 2016  (CN) .......................... 2016 1 0602635

(51) Int. Cl.
*H04N 5/225*  (2006.01)
*H04N 5/232*  (2006.01)
(52) U.S. Cl.
CPC ..... *H04N 5/23203* (2013.01); *H04N 5/23219* (2013.01)
(58) Field of Classification Search
None
See application file for complete search history.

(56) References Cited

U.S. PATENT DOCUMENTS

| 4,728,839 A * | 3/1988 | Coughlan | .............. F16M 11/18 248/183.4 |
| 2007/0206099 A1 | 9/2007 | Matsuo et al. | |

(Continued)

FOREIGN PATENT DOCUMENTS

| CN | 101030252 A | 9/2007 |
| CN | 102541085 A | 7/2012 |

(Continued)

OTHER PUBLICATIONS

Vidpro MH-300 Motorized Pan Head with Remote Control, B&H Photo Video and Amazon.com sale pages, accessed May 10, 2019. On sale since 2016. (Year: 2019).*

*Primary Examiner* — Twyler L Haskins
*Assistant Examiner* — Dwight Alex C Tejano
(74) *Attorney, Agent, or Firm* — Loeb & Loeb LLP (57) ABSTRACT

An intelligent ball head and a self-photographing method by using the same, the method comprises determining a position of the infrared emitter carried by a user; rotating the ball head to face the infrared emitter; carrying out face recognition in a view screen with the infrared emitter as a center; measuring a first distance from a human face recognized to the intelligent ball head; comparing the first distance with a second distance from the infrared emitter to the intelligent ball head so as to calculate out a distance difference; determining that the face belongs to the user when an absolute value of the distance difference is detected to be smaller than a predetermined value; controlling the photographing apparatus to focus on the human face for shooting. When a plurality of faces appear in one viewing frame, the faces may be distinguished from each other accurately and therefore achieving high-quality self-photographing.

7 Claims, 6 Drawing Sheets

(56) References Cited

U.S. PATENT DOCUMENTS

| | | | |
|---|---|---|---|
| 2009/0160951 A1* | 6/2009 | Anderson | H04N 5/2252 348/208.4 |
| 2009/0237521 A1 | 9/2009 | Nishijima | |
| 2010/0208068 A1* | 8/2010 | Elsemore | A01M 31/002 348/143 |
| 2012/0062691 A1* | 3/2012 | Fowler | F16M 11/10 348/36 |
| 2014/0009561 A1* | 1/2014 | Sutherland | B25J 5/007 348/14.05 |
| 2015/0022620 A1* | 1/2015 | Siminoff | H04M 11/025 348/14.02 |
| 2015/0109457 A1* | 4/2015 | Stout | H04N 5/222 348/169 |
| 2016/0381271 A1* | 12/2016 | Cheng | F16M 11/041 348/208.2 |
| 2017/0034403 A1* | 2/2017 | Seo | G06T 7/20 |

FOREIGN PATENT DOCUMENTS

| | | |
|---|---|---|
| CN | 105721646 A | 6/2016 |
| JP | 2008129082 A | 6/2008 |

* cited by examiner

INTELLIGENT BALL HEAD AND METHOD FOR PERFORMING SELF-PHOTOGRAPHING BY USING THE SAME

CROSS REFERENCE TO RELATED APPLICATION

This is a national entry application of a PCT international patent application serial no. PCT/CN2016/107099, filed on Nov. 24, 2016, which further claims a Chinese patent application filed on Jul. 27, 2016, serial number 201610602635.8, whose disclosures are incorporated by reference in its entirety herein.

TECHNICAL FIELD

The invention relates to the field of electronic technology, in particular to an intelligent ball head and method for performing self-photographing by using the same

BACKGROUND

In general, when people carry out self-photographing, it is necessary to fix a photographing apparatus on an intelligent ball head, set the angle and focal length well, start a countdown shooting, run up to a preset shooting point, and wait for shooting by the photographing apparatus, which is very inconvenient.

If it is necessary to remotely control the intelligent ball head to rotate to a required angle, a remote controller needs to be used for remotely controlling the ball head, while the common remote controller could only control the ball head to rotate left, right, up or down and it is difficult to know whether the angle of the photographing apparatus is appropriate or not, especially in the case a plurality of human faces appearing in one viewing frame, it is difficult to accurately focus on the human face of users, and the remote controller with live view shooting function results in a high cost of the whole system.

SUMMARY

Therefore, in order to solve the above technical problem, the embodiments of this invention provides an intelligent ball head comprising a photographing apparatus fixing unit, for fixing the photographing apparatus; a rotating unit, connected with the photographing apparatus fixing unit, for horizontally and/or vertically rotating the photographing apparatus fixed by the photographing apparatus fixing unit; at least one infrared receiving unit, for receiving infrared rays emitted by an infrared emitter carried by a user; a control unit, connected with the infrared receiving unit, the rotating unit and the photographing apparatus, wherein the control unit comprises a positioning module, for obtaining a position of the infrared emitter according to the infrared rays received by the infrared receiving unit; a rotation control module, for controlling the rotating unit to rotate according to the position obtained by the positioning module, so as to cause the photographing apparatus to face the infrared emitter; a user identification module, for controlling the photographing apparatus to shoot and carry out face recognition within a predetermined range with the infrared emitter as a center in a view screen, for measuring a first distance from one or more human faces recognized to the intelligent ball head, for comparing the first distance with a second distance from the infrared emitter to the intelligent ball head so as to calculate out a distance difference, and for determining that the face belongs to the user when an absolute value of the distance difference is detected to be smaller than a predetermined value; a photographing control module, for controlling the photographing apparatus to focus on the human face for shooting.

In one embodiment, the photographing apparatus fixing unit is used for fixing a camera, a mobile phone with a camera lens or a mobile electronic device such as a tablet computer.

In one embodiment, the rotating unit is a two-axis transmission mechanism. In one embodiment, the intelligent ball head further comprises a light supplementing unit. In one embodiment, in the user identification module, the carrying out a face recognition within a predetermined range with the infrared emitter as a center, comprises performing the face recognition within about 1.5 square meters with the infrared emitter as a center.

The embodiments of the present invention also provides a method for performing self-photographing by using an intelligent ball head, comprising emitting infrared rays through an infrared emitter carried by a user; receiving the infrared rays through an infrared receiving unit arranged on the intelligent ball head; determining a position of the infrared emitter according to the infrared rays received; rotating the intelligent ball head according to the position of the infrared emitter, so as to cause the photographing apparatus to face the infrared emitter; carrying out face recognition within a predetermined range with the infrared emitter as a center in a view screen of the photographing apparatus; measuring a first distance from a human face recognized to the intelligent ball head; comparing the first distance with a second distance from the infrared emitter to the intelligent ball head so as to calculate out a distance difference; determining that the face belongs to the user when an absolute value of the distance difference is detected to be smaller than a predetermined value; controlling the photographing apparatus to focus on the human face for shooting.

In one embodiment, the photographing apparatus arranged on the intelligent ball head comprises a camera, a mobile phone with a camera lens or a mobile electronic device such as a tablet computer.

In one embodiment, the controlling the photographing apparatus to focus on the human face for shooting further comprises supplementing light for the human face.

In one embodiment, the carrying out a face recognition within a predetermined range with the infrared emitter as a center in a view screen of the photographing apparatus comprises performing the face recognition within about 1.5 square meters with the infrared emitter as a center.

In the intelligent ball head and a self-photographing method by using the same of the invention, even if a plurality of faces appear in o viewing frame, the infrared emitter carried by a user may acquire an approximate position of the user, in conjunction with face recognition and measurement for distance from face to ball head, the face of the user may be distinguished from each other accurately and therefore achieving high-quality self-photographing.

BRIEF DESCRIPTION OF THE DRAWINGS

In order to more clearly describe the technical solutions in the specific embodiments of the present invention or in the prior art, hereinafter the accompanying drawings required to be used in the description of the specific embodiments or the prior art will be briefly introduced. Apparently, the accompanying drawings described below are only directed to some

DETAILED DESCRIPTION

A clear and complete description of the technical solutions in the present invention will be given below, in conjunction with the accompanying drawings in the embodiments of the present invention. Apparently, the embodiments described below are a part, but not all, of the embodiments of the present invention. All of other embodiments, obtained by those of ordinary skill in the art based on the embodiments of the present invention without any creative effort, fall into the protection scope of the present invention.

The technical solution of the present invention is described in detail with reference to the accompanying drawings and specific embodiments.

Figure 1:
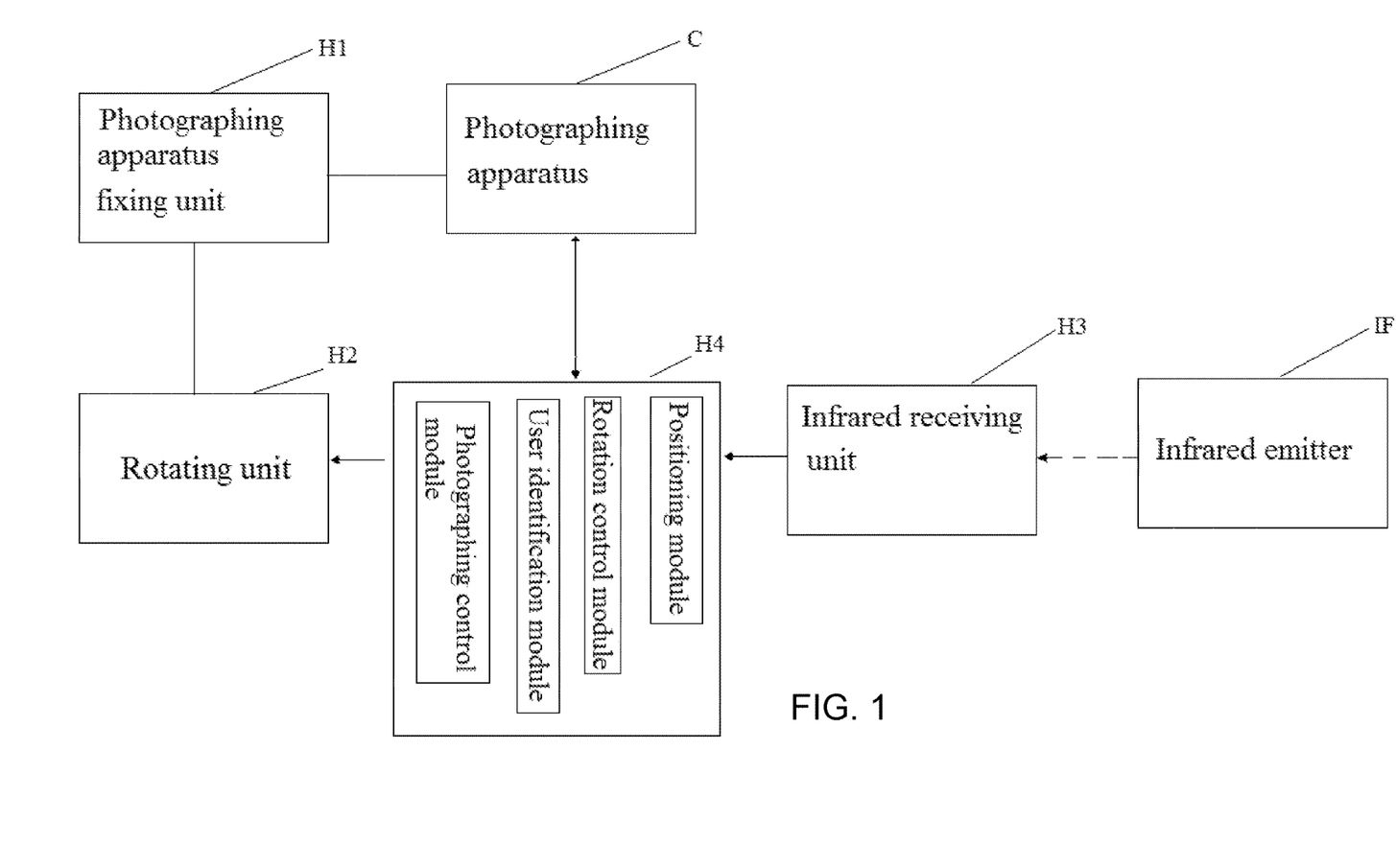
FIG. 1 is a schematic diagram of an intelligent ball head according to an embodiment of the invention.

As shown in FIG. 1, the embodiment provides an intelligent ball head, comprising a photographing apparatus fixing unit H1 that fixes the photographing apparatus C which refers to a camera, a mobile phone with a camera lens, a mobile electronic device such as a tablet computer and so on;

a rotating unit H2, connected with the photographing apparatus fixing unit, that horizontally and/or vertically rotates the photographing apparatus fixed by the photographing apparatus fixing unit;

at least one infrared receiving unit H3 that receives infrared rays emitted by an infrared emitter IF carried by a user, in particular, the infrared emitter may be fixed on a garment of a user, or the user holds the infrared emitter to point to the intelligent ball head, in one embodiment, the user controls the infrared emitter close to his face and points to the intelligent ball head;

a control unit H4 is connected with the infrared receiving unit, the rotating unit and the photographing apparatus, and the control unit H4 comprises a positioning module that obtains a position of the infrared emitter according to the infrared rays received by the infrared receiving unit;

a rotation control module that controls the rotating unit to rotate according to the position obtained by the positioning module, so as to cause the photographing apparatus to face the infrared emitter, optionally, the infrared emitter is arranged in the center of a view screen of the photographing apparatus;

a user identification module that controls the photographing apparatus to shoot and carry out face recognition within a predetermined range with the infrared emitter as a center in the view screen, and the predetermined range with the infrared emitter as a center comprises at least the user but not too broad to cause a difficulty to identify the user, in one embodiment, the predetermined range may be about 1.5 square meters; the user identification module is also used to measure a first distance from one or more human faces recognized to the intelligent ball head, compare the first distance with a second distance from the infrared emitter to the intelligent ball head so as to calculate out a distance difference, and determines that the face belongs to the user when an absolute value of the distance difference is detected to be smaller than a predetermined value and the predetermined value refers to a third distance from the infrared emitter to the face of the user which is about equivalent to an arm length of the user when the infrared emitter is the farthest from the face of the user such as the user holds an infrared remote controller and extends the arm to the remote, optionally, the predetermined value is 1 meter;

a photographing control module that controls the photographing apparatus to focus on the human face for shooting after the identification of the user's face by user identification module.

In the intelligent ball head of the invention, even if a plurality of faces appear in one viewing frame, the infrared emitter carried by a user may acquire an approximate position of the user, in conjunction with face recognition and measurement for distance from face to ball head, the face of the user may be distinguished from each other accurately and therefore achieving high-quality self-photographing.

In a preferred embodiment, the rotating unit is a two-axis transmission mechanism which may control the ball head to rotate left, right, up or down so as to expand the shooting range of the photographing apparatus.

In one embodiment, the intelligent ball head further comprises a light supplementing unit, so that the high-quality self-photographing photo may be obtained when the lighting condition is poor or not preferable, in one embodiment, the light supplementing unit may automatically detect a lighting condition on the human face and adjust the color temperature; in one embodiment, the light supplementing unit comprises a plurality of LEDs.

Figure 2:
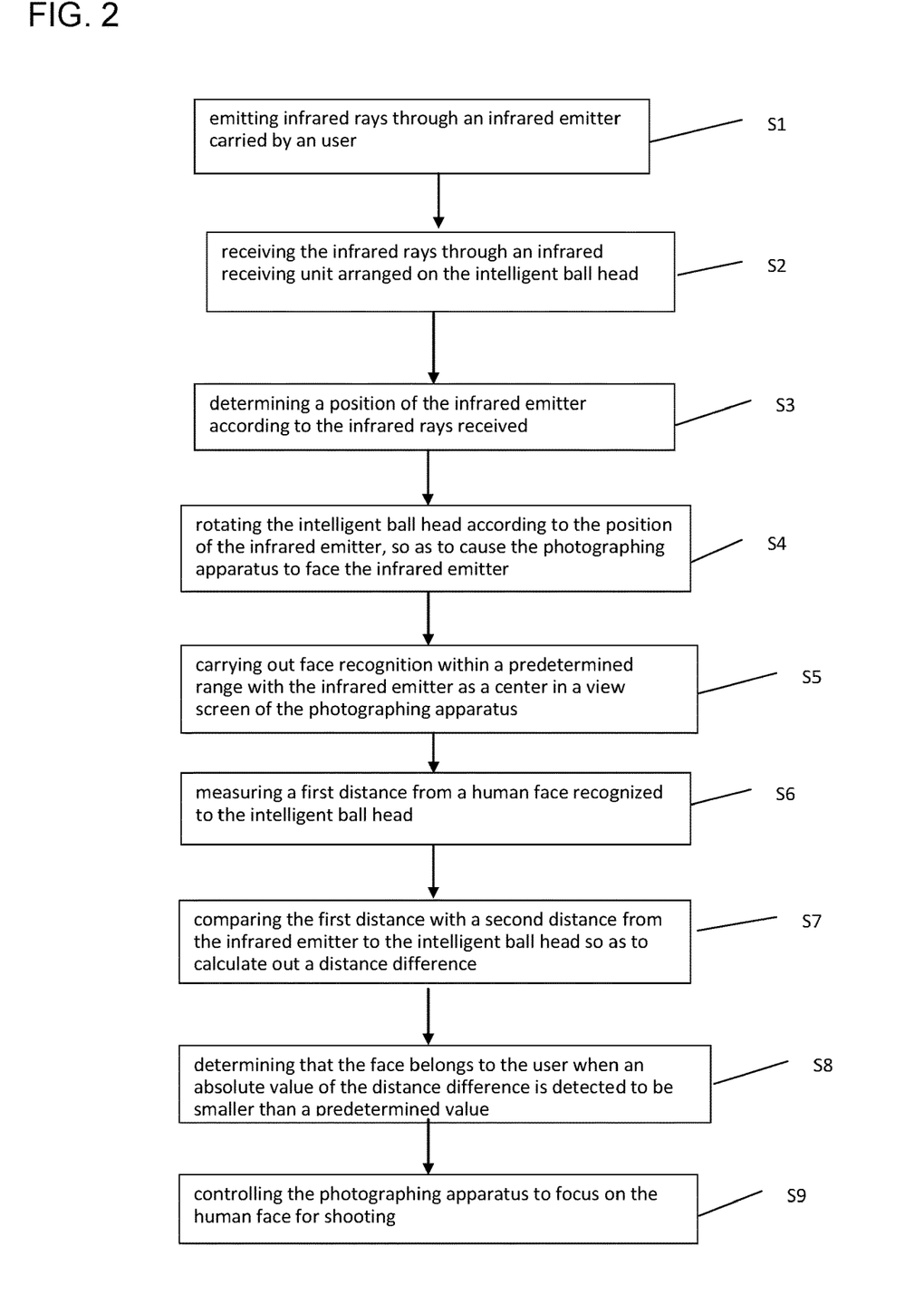
FIG. 2 is a flow chart of a method for performing self-photographing by using an intelligent ball head according to an embodiment of the invention.

As shown in FIG. 2, the embodiment of the invention provides a method for performing self-photographing by using an intelligent ball head, comprising S1. emitting infrared rays through an infrared emitter carried by a user;

S2. receiving the infrared rays through an infrared receiving unit arranged on the intelligent ball head;

S3. determining a position of the infrared emitter according to the infrared rays received;

S4. rotating the intelligent ball head according to the position of the infrared emitter, so as to cause the photographing apparatus to face the infrared emitter, optionally, the photographing apparatus comprising a camera, a mobile phone with a camera lens or a mobile electronic device such as a tablet computer;

S5. carrying out face recognition within a predetermined range with the infrared emitter as a center in a view screen of the photographing apparatus, in one embodiment, the predetermined range being about 1.5 square meters;

S6. measuring a first distance from a human face recognized to the intelligent ball head;

S7. comparing the first distance with a second distance from the infrared emitter to the intelligent ball head so as to calculate out a distance difference;

S8. determining that the face belongs to the user when an absolute value of the distance difference is detected to be smaller than a predetermined value, the predetermined value being about 1.5 square meters;

S9. controlling the photographing apparatus to focus on the human face for shooting.

In the self-photographing method by using the invention intelligent ball head of the invention, even if a plurality of faces appear in one viewing frame, the infrared emitter carried by a user may acquire an approximate position of the user, in conjunction with face recognition and measurement for distance from face to the ball head, the face of the user may be distinguished from each other accurately and therefore achieving high-quality self-photographing.

In one embodiment, the controlling the photographing apparatus to focus on the human face for shooting further comprises performing light supplementing for human face, so as to obtain the high-quality self-photographing photo when the lighting condition is poor or not preferable.

The embodiments of the present invention are further described in detail by taking a specific intelligent ball head in the following as an example.

Figure 3:
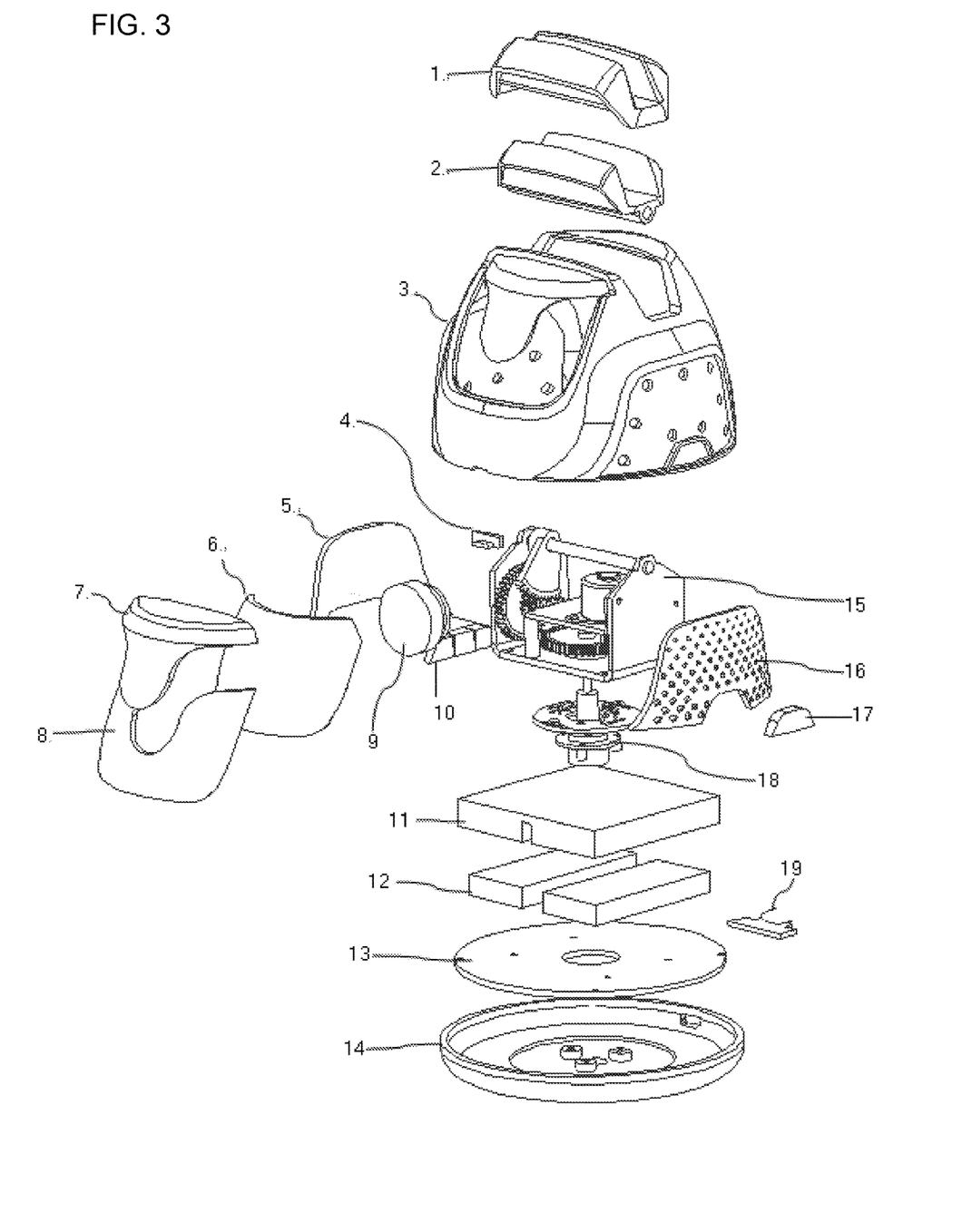
FIG. 3 is an exploded diagram of an intelligent ball head according to an embodiment of the invention.

FIG. 3 shows an exploded diagram of an intelligent ball head, wherein 1 represents a soft rubber, 2 represents an ABS plastic substrate, 1 and 2 together represent a mobile phone support that fixes a mobile phone, 3 represents a ball head shell, 4 represents a signal light guide lamp which indicates electricity and signal connection conditions, 5 and 16 represent decorative soft rubbers at the left and right sides of the intelligent ball head, 6 represents an LED support, 7 represents an outer cover of an infrared receiving head, 8 represents a diffuser cover of a light supplementing lamp, 9 represents the infrared receiving head, 10 represents a functional key, 11 represents a battery cover, 12 represents a battery, 13 represents a main PCB, 14 represents a bottom shell, 15 represents a two-shaft transmission mechanism assembly, 17 represents s a switch key, 18 represents a conductive slip ring assembly, and 19 represents a MICRO USB assembly.

Figure 4:
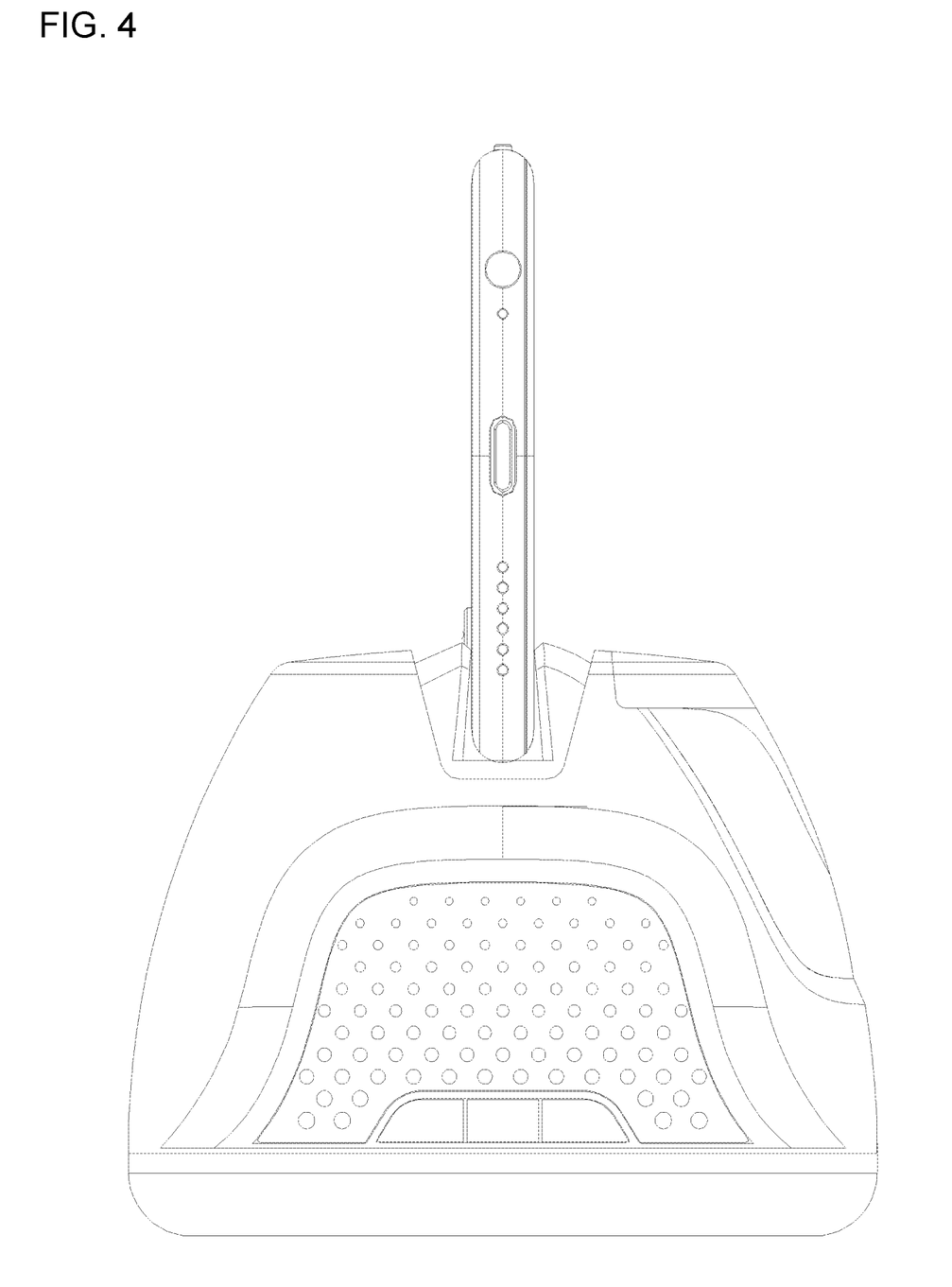
FIG. 4 is a side diagram of the intelligent ball head shown in FIG. 3.

FIG. 4 is a side diagram of the intelligent ball head, wherein 20 represents a mobile phone used as a photographing apparatus, 22 represents a main body assembly of the intelligent ball head, and 14 represents a bottom shell.

Figure 5:
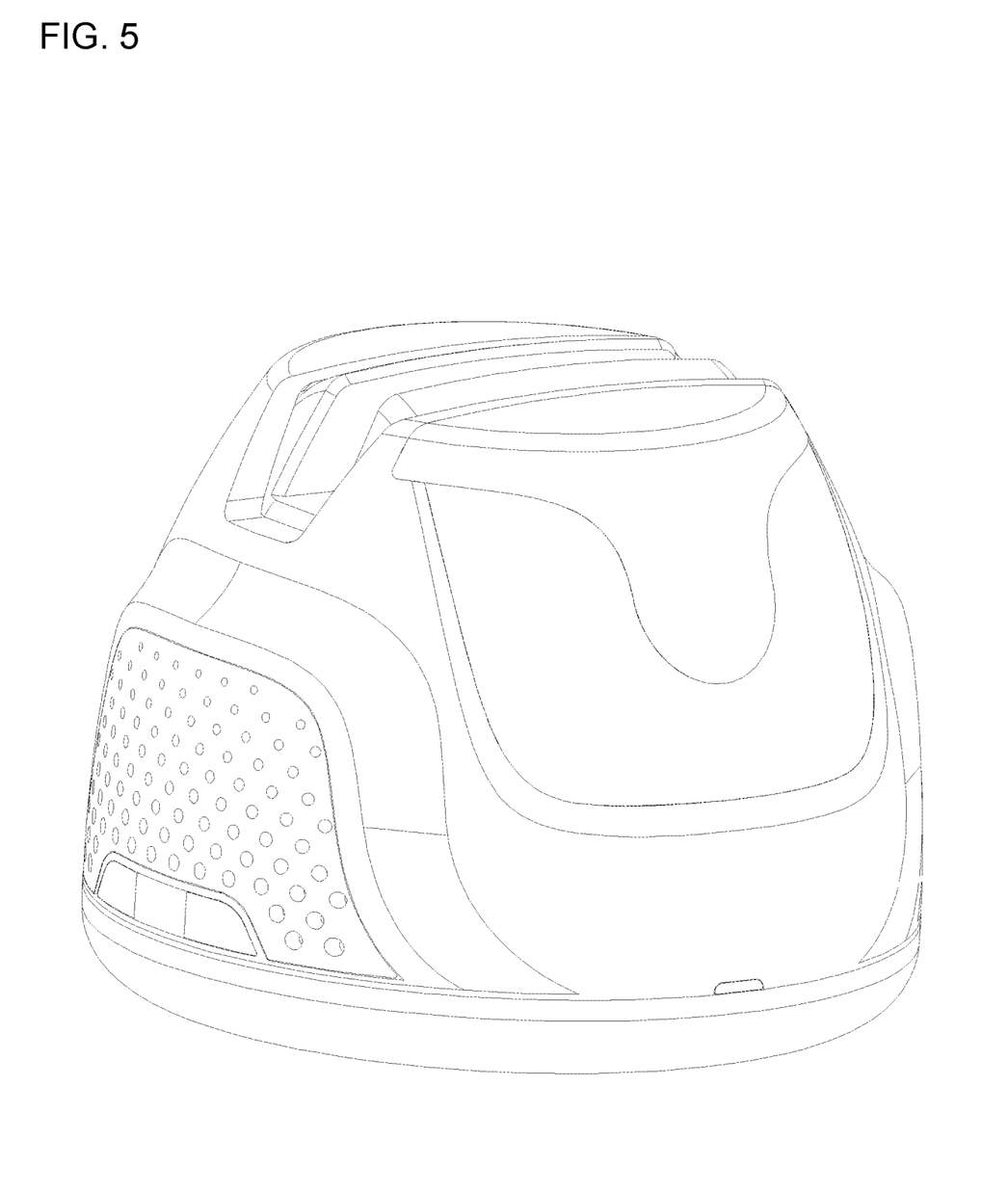
FIG. 5 is another side diagram of the intelligent ball head shown in FIG. 3.

FIG. 5 is another side diagram of the intelligent ball head, wherein 7 represents an outer cover of the infrared receiving head, and 8 represents a diffuser cover of the light supplementing lamp.

Figure 6:
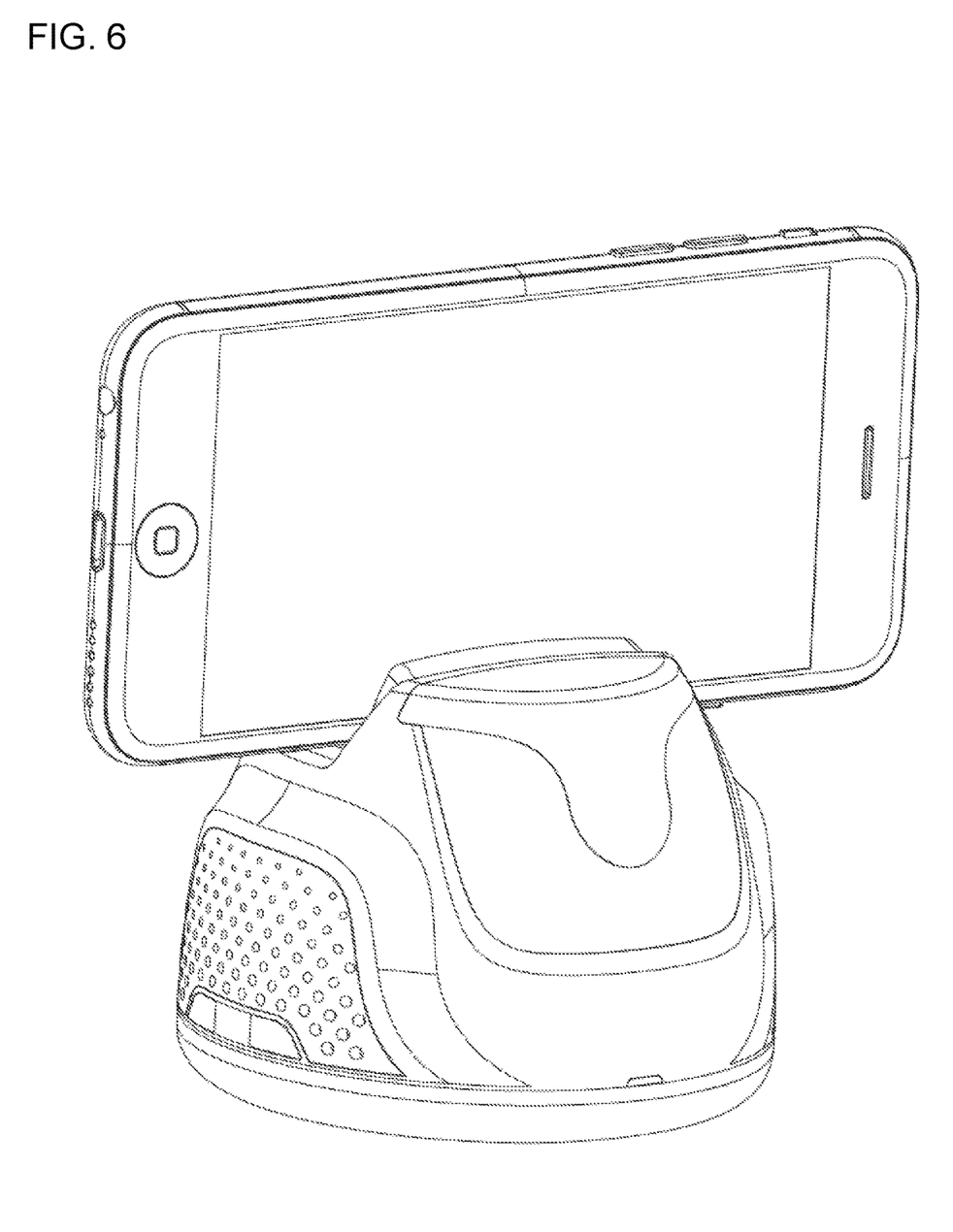
FIG. 6 is a rotary schematic diagram of the intelligent ball head shown in FIG. 3.

FIG. 6 is a rotary schematic diagram of the intelligent ball head, and it may be seen that the intelligent ball head may freely rotate left, right, up or down.

Obviously, it should be noted that the above embodiments are merely used for illustrating rather than limiting the technical solutions of the present application; although the present application is illustrated in detail with reference to the aforementioned embodiments, it should be understood by those of ordinary skill in the art that modifications may still be made on the technical solutions disclosed in the aforementioned respective embodiments, or equivalent substitutions may be made to part of technical characteristics thereof; and these modifications or substitutions shall not make the nature of the corresponding technical solutions depart from the spirit and scope of the technical solutions of the respective embodiments of the present disclosure.

What is claimed is:

1. An intelligent ball head comprising:
    a photographing apparatus fixing unit, for fixing the photographing apparatus;
    a rotating unit, connected with the photographing apparatus fixing unit, for horizontally and/or vertically rotating the photographing apparatus fixed by the photographing apparatus fixing unit;
    at least one infrared receiving unit, for receiving infrared rays emitted by an infrared emitter carried by a user;
    a control unit, connected with the infrared receiving unit, the rotating unit and the photographing apparatus;
    wherein the control unit comprises a positioning module is configured to obtain a position of the infrared emitter of the infrared rays received by the infrared receiving unit;
    a rotation control module configured to control the rotating unit to rotate of the position obtained by the positioning module to cause the photographing apparatus to face the infrared emitter;
    a user identification module, in response to receiving user instructions, configured to control the photographing apparatus to shoot and configured to execute facial recognition within about 1.5 square meters with the infrared emitter as a center in a view screen, wherein the user identification module is configured to measure a first distance from one or more human faces recognized to the intelligent ball head, wherein the user identification module is configured to compare the first distance with a second distance from the infrared emitter to the intelligent ball head to calculate out a distance difference, wherein the user identification module is configured to determine that the face belongs to the user when an absolute value of the distance difference is detected to be smaller than a predetermined value; and
    a photographing control module is configured to control the photographing apparatus to focus on the human face for shooting.

2. The intelligent ball head of claim 1, wherein the photographing apparatus fixing unit is configured for fixing a camera, a mobile phone with a camera lens or a mobile electronic device.

3. The intelligent ball head of claim 1, wherein the rotating unit comprises a two-axis transmission mechanism.

4. The intelligent ball head of claim 1, further comprising a light supplementing unit.

5. A processor-implemented method for performing self-photographing by using an intelligent ball head, characterized in comprising:
    emitting infrared rays through an infrared emitter carried by a user;
    receiving the infrared rays through an infrared receiving unit arranged on the intelligent ball head;
    determining a position of the infrared emitter according to the infrared rays received;
    rotating the intelligent ball head according to the position of the infrared emitter, so as to cause the photographing apparatus to face the infrared emitter;
    executing facial recognition within about 1.5 square meters with the infrared emitter as a center in a view screen of the photographing apparatus;
    measuring a first distance from a human face recognized to the intelligent ball head;
    comparing the first distance with a second distance from the infrared emitter to the intelligent ball head so as to calculate out a distance difference;
    determining that the face belongs to the user when an absolute value of the distance difference is detected to be smaller than a predetermined value; and
    controlling the photographing apparatus to focus on the human face for shooting.

6. The processor-implemented method of claim 5, wherein rotating the intelligent ball head comprises rotating a camera or a camera lens disposed on a mobile phone or a mobile electronic device.

7. The processor-implemented method of claim 5, wherein controlling the photographing apparatus to focus on the human face for shooting further comprising detecting a lighting condition on the human face and supplementing light for the human face in response to a poor lighting condition.

* * * * *